United States Patent [19]

Waters

[11] 4,394,754

[45] Jul. 19, 1983

[54] APPARATUS FOR LOW FREQUENCY TORSIONAL SHEAR WAVE LOGGING

[75] Inventor: Kenneth H. Waters, Cape Town, South Africa

[73] Assignee: Conoco Inc., Ponca City, Okla.

[21] Appl. No.: 195,368

[22] Filed: Oct. 9, 1980

[51] Int. Cl.³ .............................................. G01V 1/16
[52] U.S. Cl. ..................................... 367/75; 181/102; 367/184
[58] Field of Search ................. 367/75, 182, 184, 186, 367/27; 181/102, 104; 310/154, 36, 71

[56] References Cited

U.S. PATENT DOCUMENTS

| | | | |
|---|---|---|---|
| 2,784,796 | 3/1957 | Overton | 367/27 |
| 3,158,833 | 11/1964 | Hautly | 367/186 |
| 3,354,983 | 11/1967 | Erickson et al. | 367/75 X |
| 4,114,721 | 9/1978 | Glenn, Jr. | 181/102 X |

Primary Examiner—Maynard R. Wilbur
Assistant Examiner—K. R. Kaiser
Attorney, Agent, or Firm—William J. Miller

[57] ABSTRACT

A borehole logging device for obtaining shear wave velocities in formations adjacent the borehole, a device which utilizes a closely controlled, relatively low frequency torsional shear wave. The system includes an elongated housing for suspension within the borehole, said housing including a shear wave source for generating shear waves directly within the borehole wall, and including two spaced, variable reluctance torsional detectors which are also placed in direct contact with the borehole wall. The torsional detectors are, of course, at known spacing from the source such that cross-correlative procsssing of the detector output signals will enable a very accurate phase difference indicative of the shear wave velocity in the formation.

6 Claims, 5 Drawing Figures

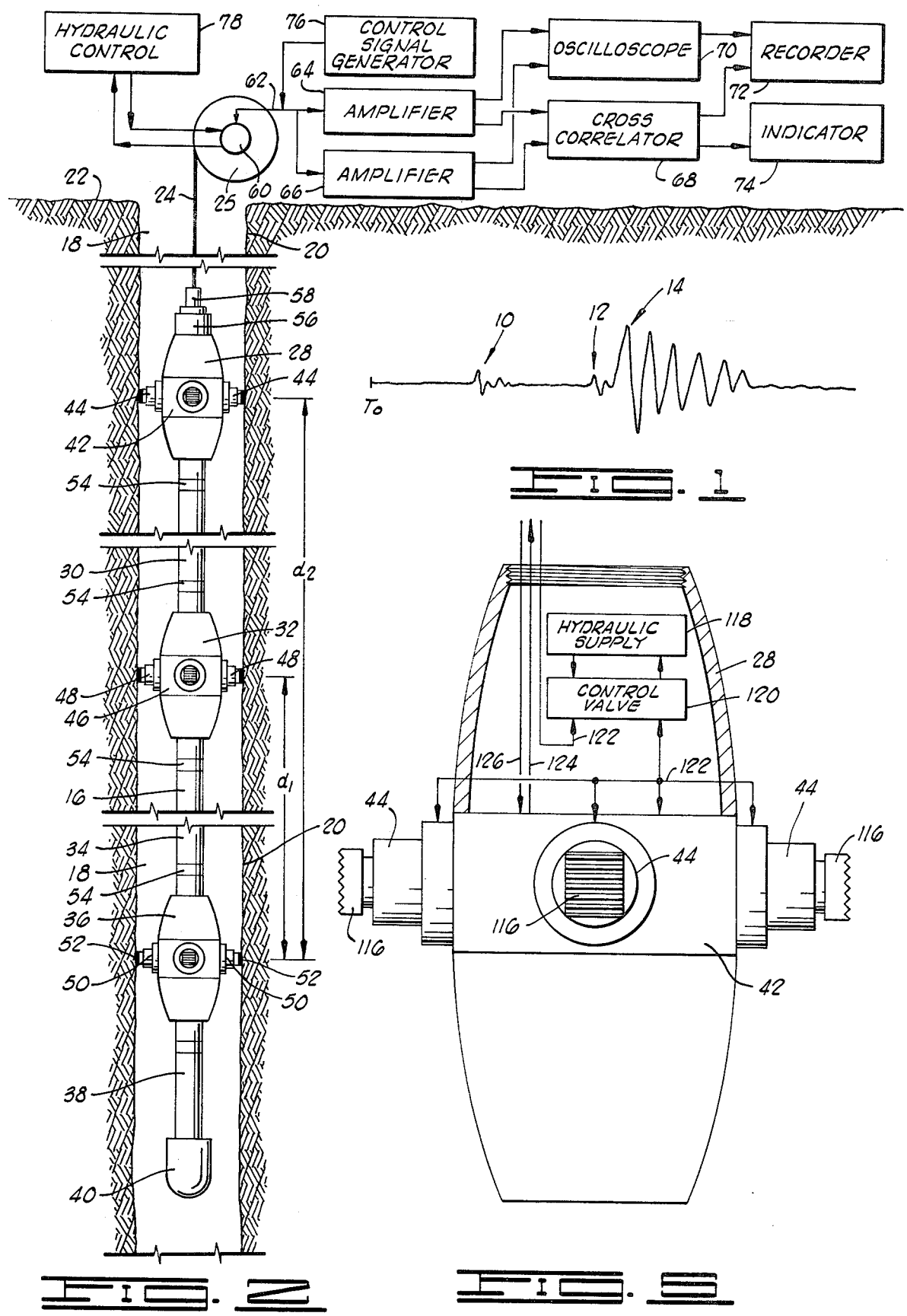

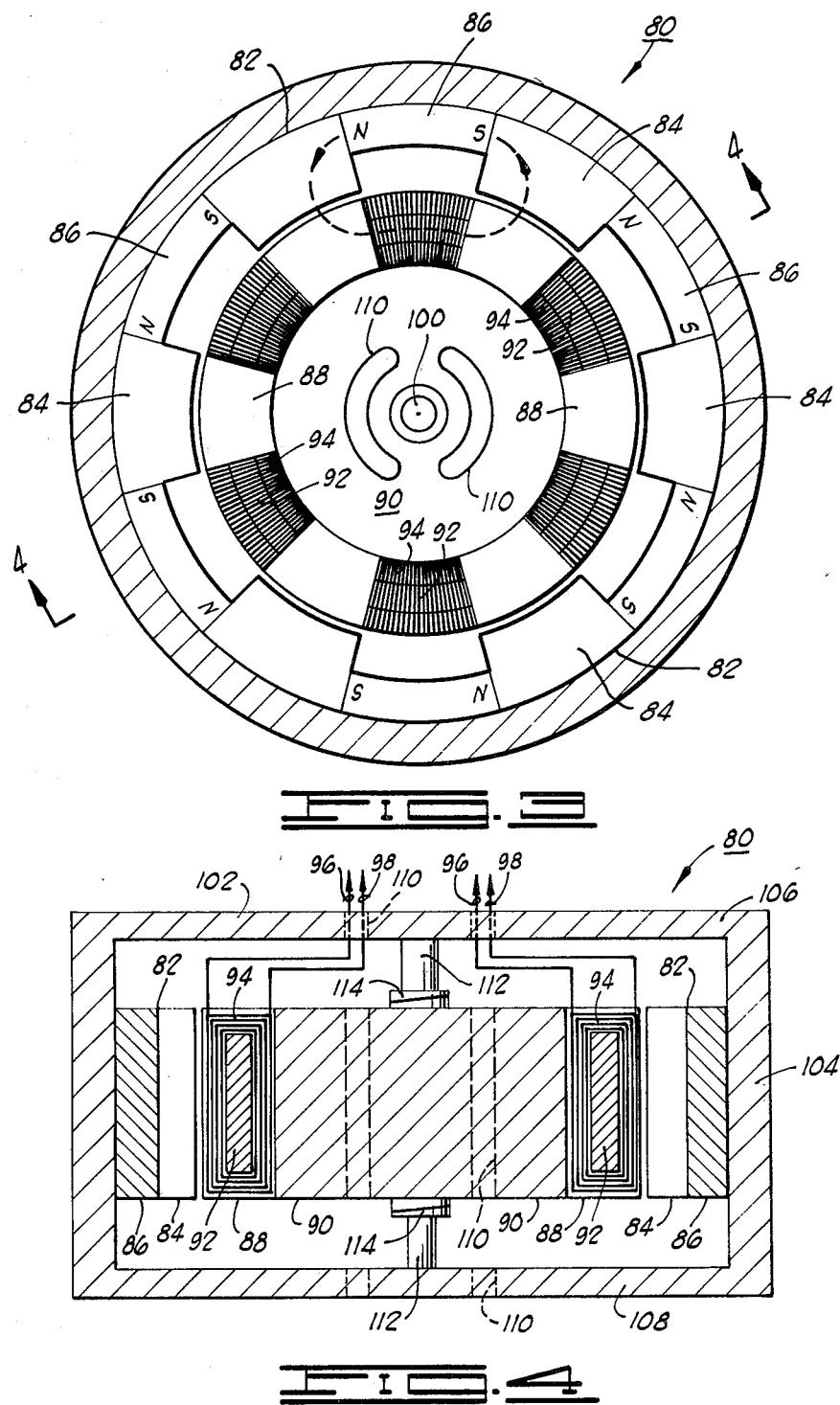

APPARATUS FOR LOW FREQUENCY TORSIONAL SHEAR WAVE LOGGING

BACKGROUND OF THE INVENTION

1. Field of the Invention

The invention relates generally to shear wave logging tools for examining earth formations adjacent a borehole and, more particularly, but not by way of limitation, it relates to an improved form of downhole shear wave logging tool and the associated detector devices.

2. Description of the Prior Art

Continuous logging devices utilizing compressional waves in a borehole are quite old and well-known and that type of velocity information is very useful in its own right; however, the actual measurement of shear wave velocities in formations adjacent a borehole has proven much more difficult such that logs of shear velocity are uncommon. The present method for carrying out shear wave logging uses the converted Rayleigh wave which is formed at the hole boundary near the compressional wave transmitter, and processing is included to measure the Rayleigh transit time down the wall of the borehole by measuring time differences between Rayleigh waves reconverted to compressional waves at each of two compressional wave receivers. Various prior art forms of apparatus are known for carrying out this type of wave evaluation. Such utilization of the Rayleigh wave arrival time is utilized since it is large amplitude and arrives later than the shear SV wave which may be buried in noise. Thus, attempts at shear wave velocity which is less than the shear SV wave velocity but not by a reliably constant proportion.

Some prior attempts have been made to generate and detect a shear wave within the borehole wall thereby to avoid those inconsistencies introduced by the borehole fluid. U.S. Pat. No. 3,061,037 in the name of Evans generated shear waves within a borehole by cementing an electrical shear wave generator in the borehole. This approach has obvious drawbacks as regards the desirable practice of traversing the borehole or positioning the logging tool adjacent selected formations. U.S. Pat. Nos. 3,390,377 and 3,333,238 represent those forms of shear wave logging apparatus wherein intermediate wave transit in the fluid of the borehole is utilized and data processing then attempts to ascertain the actual shear wave velocity from the series of seismic waves detected at varying velocities. These teachings transmit through the fluid to propagate shear wave, compressional and Rayleigh wave energy through the formation whereupon energy is detected after once more passing through the fluid to the receivers. Finally, the U.S. Pat. No. 3,213,358 in the name of Piety is of interest as it teaches a method for electromagnetically inducing shear waves in adjacent formations for subsequent detection and velocity analysis.

SUMMARY OF THE INVENTION

The present invention relates to improvements in shear wave logging apparatus wherein wave energy transmission and detection is made in direct contact with the borehole wall as torsional shear wave energy is generated at a relatively low frequency having lesser attenuation propensity. The torsional shear wave logger of the present invention carries out generation and detection of one or several low frequency shear waves which are accurately controlled. The controlled frequency torsional shear wave is generated directly in the borehole wall such that it propagates along the wall without conversion to other wave types whereupon it is received by two detectors at known spacing. The detector outputs are then cross-correlated to obtain the accurate phase difference of the signals which then provides a determinable measurement of shear wave velocity in the adjacent formation. Since it is conceivable that there will be more than one path of propagation in the adjacent formation, two or more controlled frequencies may be used to resolve any ambiguities.

Therefore, it is an object of the present invention to provide a torsional shear wave logger that is readily positionable adjacent selected formations of a borehole to derive accurate shear wave velocity readout.

It is also an object of the present invention to provide an improved logging tool utilizing variable reluctance torsional geophones which are highly insensitive to level and may be tuned to a narrow range of frequencies.

It is yet another object of the present invention to provide a shear wave logging detector that is more rugged and adaptable to the condition and movements of a downhole tool.

Finally, it is an object of the present invention to provide a variable reluctance torsional geophone that is mechanically resonant and capable of being tuned to a narrow range of frequencies as selected for shear wave transmission.

Other objects and advantages of the invention will be evident from the following detailed description when made in conjunction with the accompanying drawings which illustrate the invention.

BRIEF DESCRIPTION OF THE DRAWINGS

FIG. 1 is a line graph of a typical seismic wave detector response as might be seen by a borehole logging tool;

FIG. 2 is an idealized plan view in partial block diagram of a borehole logging tool and associated apparatus as constructed in accordance with the present invention;

FIG. 3 is a top plan view of the armature and rotor of a variable reluctance torsional geophone of the present invention;

FIG. 4 is a view in vertical section through the torsional geophone as it is secured within a housing member; and FIG. 5 is a side elevation, with parts shown in section, of a detector housing of the borehole logging tool.

DETAILED DESCRIPTION OF THE INVENTION

FIG. 1 illustrates on a time line graph the energy detection of a typical seismic wave within a fluid filled borehole wherein the source transducer is energized at time $T_0$. The detector will see successively a first compressional wave 10 followed by a shear SV wave 12 falling immediately adjacent to the beginning of the Rayleigh wave 14. The Rayleigh wave 14 is quite large in amplitude compared with the compressional wave 10 and shear wave 12 and, therefore, it has traditionally been capable of measurement by using much larger thresholds on the timing gate. In accordance with past practice, at each selected borehole depth the logging tool could be run to produce an oscillograph picture of the wave train such that the large amplitude Rayleigh wave 14 could be picked by the operator. The Rayleigh wave 14 arrival time is slightly later than the shear wave 12, but Rayleigh wave 14 is used for indication since the shear wave 12 arrival is often buried in noise and indistinguishable. Thus, the velocity normally measured is the Rayleigh wave velocity; however, this velocity is less than the actual shear wave velocity but it is not less by a reliable constant proportion.

Therefore, and in accordance with the present invention, an accurately controlled torsional shear (SV) wave is generated directly within the borehole wall at an accurately controlled low frequency, on the order of 1 Kilohertz, and the detectors are also positioned to transduce wave energy directly from the borehole wall. The detectors are positioned at a known vertical spacing, on the order of 10–20 feet, as required to provide the needed resolution for determining shear wave velocities. Each of the detectors is a type which is insensitive to level, and which may be highly tuned to a narrow band frequency range.

Referring to FIG. 2 a borehole logging tool 16 is positionably suspended within a borehole 18 having generally circular wall 20 as formed from earth surface 22. The borehole logging tool 16 may be suspended by such as a standard logging cable 24 extensibly supported by a winch assembly 26 located adjacent the borehole surface opening.

Logging tool 16 consists of an upper detector housing 28 connected on the upper end of a cylindrical pipe or spacer housing 30 which carries a second spaced detector housing 32 therebeneath. A lower spacer housing 34 is then coupled to extend below detector housing 32 for sealed interconnection with a transmitter housing 36. A lower sealed housing 38 is then secured to extend beneath transmitter housing 36 to terminate the logging tool in a lower, weighted drag cap 40. Precise weighting of the logging tool may be adjusted since most boreholes are partially or completely filled with fluids of widely varying specific gravity.

Each of detector housings 28 and 32 carry a variable reluctance torsional geophone within, as will be further described in detail, and each includes a plurality of hydraulic pressure pads for maintaining quadrilateral contact with borehole wall 20. Thus, central housing 42 of detector housing 28 includes a plurality of circumferentially equi-spaced hydraulic pressure pads 44 which may be actuated from the surface control position to engage the sides of borehole 18. Similarly, a central housing 46 of detector housing 32 includes a plurality of similarly disposed hydraulic pressure pads 48. The transmitter housing 36 includes similarly arrayed pressure pads 50; however, the transmitter pressure pads 50 each carry a shear wave transducer 52 on the outer end thereof. Shear wave transducer 52 may take the form of any of various known and commercially available electromechanical devices for generating shear wave stress. For example, transducer 52 may be a ceramic or magnetostrictive device, the primary criterion for selection being that the device have high Q over a relatively narrow frequency band around 1 Kilohertz.

The detector housings 28 and 32 and transmitter housing 36 are all positioned at known spacings $d_1$ and $d_2$, as shown, to provide known parameters for velocity determinations. Thus, the detector units are maintained in properly spaced relationship by upper and lower spacer housings 30 and 34, each of which includes upper and lower acoustic decoupling joints 54. The acoustic decouplers 54 are a standard fitting as used in logging tools and may comprise a threaded section of a suitable molded length formed from epoxy with lead granules, fiber, etc. in suspension. The acoustic decoupler 54 prevents transmission of interference via the body of the logging tool 16 between transmitter housing 36 and the above-located receiver housings 32 and 28. Finally, the upper end detector housing 28 is sealingly fitted with a suitable end cap 56 and feed-through logging connector 58 as attached to logging cable 24.

The winch assembly 26 includes the standard slip ring connector assembly 60 which provides interconnection of control conduits 62 to the processing circuitry. Thus, control conduits 62 provide selected detector inputs to amplifiers 64 and 66 which, in turn, provide respective outputs to a standard cross-correlator 68. The outputs from amplifier 64 and 66 may also be applied to an oscilloscope 70 for operator surveillance while permanent record may be made on a field recorder 72. The output from cross-correlator 68 may also be applied to recorder 72 as well as to another selected form of indicator 74. A control signal generator 76 for controlling shear wave transmission frequency is connected for input to control conduit 62, and hydraulic control 78 may be applied for routing through logging cable 24 to the logging tool 16. It is preferable that hydraulic control 78 provide only electrical input to control conduit 62, actual hydraulic power being initiated from within the logging tool 16, as will be described.

FIGS. 3 and 4 illustrate a variable reluctance torsional geophone detector as utilized in the present invention within each of detector housings 28 and 32. A detector 80, shown within casing in FIG. 4, is capable of being tuned to a vary narrow range of frequencies in the relatively low frequency range, and it provides a rugged form of geophone device that is insensitive to level. An outside ring or armature 82 consists of a plurality of pole pieces 84 formed of highly permeable material interstided in equal spacing with a like plurality of magnet segments 86. The high permeability metal segments 82 may be suitably bonded to adjacent segments of such as ceramic magnet 86 to form the armature 82. Present design calls for a commercially available ceramic permanent magnet having extremely high coercive force and known as a samarium cobalt type magnet. Concentric within the armature 82, in close spacing, is a rotor ring 88 formed of highly permeable magnetic material which is bonded around the outer circumfery of a rotor 90 formed from non-magnetic material. The rotor ring 88 is then formed to have a plurality of equi-spaced segments formed as coil cores 92 within the rotor ring circumfery. The cores 92 may be unitarily formed with the rotor ring segments 88 but of reduced cross-section as shown to better advantage in FIG. 4.

A respective coil 94 is then wound on each of the core segments 92, and the coils 94 are each flux-threaded in alternating opposite directions such that their respective pairs of output leads 96 and 98 must be interconnected or paralleled in alternately opposite polarities.

The rotor 90 is normally positioned by means of a torsion bar 100, as shown in FIG. 3, with respective coils 94 threaded by the flux from the respective magnetic pole pieces 86, as shown by the loop arrow. Thus, a slight rotation of the composite rotor 90 will increase the flux through each of the coils 94 either positively or negatively depending upon the sign of rotation.

As shown in FIG. 4, the entire detector 80 is supported within a cylindrical case 102. Case 102 includes a cylindrical side wall 104 and upper and lower plates 106 and 108, and the armature 82 is suitably secured within side wall 104. The upper and lower plates 106 and 108, as well as rotor 90, include feedthrough passages 110 which may be utilized for passage of electric wiring and hydraulic interconnections between detector housing 28, 32 and transmitter housing 36 (see FIG. 2). The rotor 90 is secured in position to the armature 82 as torsion bar 112 is secured to upper and lower plates 106 and 108. It is desirable that the armature 82 and rotor 90 be resonant with respect to one another at a selected frequency of operation; therefore, arrangement is made for the upper spindle portion of torsion bar 112 to be of slightly larger diameter than the lower portion such that the rotor 90 may be clamped by means of locking collars 114 at a selected position upward or downward on torsion bar 112. Thus, with knowledge of the moment of inertia of the rotor 90, an adjustment up or down relative to torsion bar 112 will vary the spring constant whereupon reclamping will cause the resonant frequency to change accordingly.

FIG. 5 illustrates a detector housing, e.g. detector housing 28, showing the basic concepts of construction. Thus, the detector housing 28 includes a mid-portion 42 which receives the torsional geophone 80 (FIG. 4) in secure affixure therein. Secured in quadrature array about the housing mid-portion 42 are a plurality of telescopic hydraulic pistons or pressure pads 44 which may be extended outward a finite distance to place a pressure pad foot 116 into contact with an adjacent borehole wall. The upper detector housing 28 may include the necessary hydraulic supply 118, including necessary pump, functioning in concert with with a control valve 120 as actuated by surface control on a lead 122 to effect hydraulic pressure changes in conduits 124 as connected in parallel to the quadrature arrayed pressure pads 44. Further hydraulic control conduits 122 from control valve 120 are led through the feed-through areas 110 of the geophone 80 to extend on downward for interconnection with the hydraulic telescoping pressure pads 48 and 50 within detector housing 32 and transmitter housing 36, respectively. Detected output from the respective torsional geophones may be applied on internal connectors 124 through the logging cable 24 to the surface station, and the transmitter control signal is applied down through the logger string by means of conduits 126.

In operation, and referring to FIG. 2, the logging tool 16 is lowered via logging cable 24 down within borehole 18 to a designated depth adjacent a selected formation. Continuous downward logging may be carried out by repetitive release and refirming of the logging tool at selected intervals down along the borehole. The control signal generator 76 is operated to produce what is considered a low frequency for shear wave generation, i.e. 1 Kilohertz, such that the transducers 52, each in contact with borehole wall 20, effect generation of shear waves directly within the adjacent formation as the respective detectors 80 in detector housings 28 and 32 are responsive to pressure pads 48 and 44 to provide output of the received shear wave signals at respective travel distances of $d_1$ and $d_2$. Each of shear wave transducers 52 is controlled to generate shear waves at a specific and closely controlled frequency by control signal generator 76, and each of the torsional geophones 80 (FIG. 4) as contained in detector housings 32 and 28 are mechanically tuned to be optimally responsive to the selected control frequency.

Outputs from the respective torsional geophones are then transmitted up to amplifier 64 and 66 for input to the cross-correlator 68 which has the capability of measuring the phase difference of two 1 Kilohertz signals to as little as 1° which is equivalent to a time resolution of 3 microseconds. Thus, for ten feet separation ($d_2 - d_1$) between the detectors and a highest shear wave velocity of, e.g. 14,000 feet per second, the time to be measured would be $$(10 \times 10^6)/14,000 = 700 \text{ microseconds.} \quad (1)$$

Hence, the minimum accuracy should be around 0.42 percent.

The foregoing discloses a novel form of borehole logging tool for obtaining shear wave velocities in formations adjacent a borehole as such system utilizes generation of controlled low frequency torsional shear waves for detection at spaced points by means of electromechanical sensors that are resonant at or near control frequency. The present apparatus enables actual detection of the much sought after shear wave first arrival, and avoids inconsistencies that are inherent in prior modes of estimating shear wave velocities from arrivals of related Rayleigh and/or compressional wave perturbances.

Changes may be made in the combination and arrangement of elements as heretofore set forth in the specification and shown in the drawings; it being understood that changes may be made in the embodiments disclosed without departing from the spirit and scope of the invention as defined in the following claims.

I claim:

1. A system for shear wave logging of formations adjacent a borehole utilizing a controlled frequency torsional wave, comprising:

elongated housing means suspended for controlled vertical positioning within said borehole;

source means carried by said housing and positionable against the wall of said borehole for generating a selected frequency torsional shear wave;

first and second variable reluctance torsional detector means carried by said housing at a first and second known spacing from said source means and being in contact with the wall of said borehole, each detector means having an armature means of ring shape having plural permanent magnet segments of equal arcuate length intersticed in equal spacing by plural segments of high permeability metal, rotor means of circular shape disposed for close positioning within said armature means and having a nonmagnetic central portion secured to a concentric high permeability outer portion that is formed to provide plural cores, and having plural coils equispaced therearound as formed on said respective cores for disposition in flux associative positioning to said plural permanent magnets, and means for rigidly securing said armature means to said housing means, and torsion bar means for axially securing said rotor means to said housing means, and means connecting opposite ends of each of said plural coils to provide the detector output;

means for processing output signals of said first and second detector means to determine signal phase difference which for known spacing difference is indicative of velocity in the formation.

2. A system as set forth in claim 1 wherein said means for processing comprises:

cross-correlator means receiving said output signals of said first and second detector means; and output display means indicating the phase difference of said output signals.

3. A system as set forth in claim 1 wherein:

said source means is energized at a frequency of approximately 1 Kilohertz.

4. A system as set forth in claim 3 wherein:

said torsion bar means is adjusted to render said rotor means resonant to vibrations of approximately 1 Kilohertz.

5. A seismic wave detector for detecting shear waves in a formation adjacent a borehole, comprising:

housing means for secure disposition within said borehole;

means carried by said housing means for actuation to position said housing means in said borehole, armature means of ring shape having plural permanent magnet sections of equal arcuate length intersticed in equal spacing by plural segments of high permeability metal;

rotor means of circular shape disposed for close positioning within said armature means, and having a non-magnetic central portion secured to a concentric high permeability outer portion that is formed to provide plural cores, and having plural coils equi-spaced therearound as formed on said respective cores for disposition in flux associative positioning to said plural permanent magnets;

means for rigidly securing said armature means to said housing means;

torsion bar means for axially securing said rotor means to said housing means; and means connecting opposite ends of each of said plural coils to provide a detector output.

6. A seismic wave detector as set forth in claim 5 wherein:

said torsion bar means is adjustable to selectively vary the resonant frequency of said rotor means.

* * * * *